United States Patent [19]
Ash et al.

[11] Patent Number: 5,869,576
[45] Date of Patent: Feb. 9, 1999

[54] GRAFT COPOLYMERIZED COMPOSITIONS

[75] Inventors: Carlton Edwin Ash, Sugar Land; Narayana Mysore; Pui Kwan Wong, both of Houston, all of Tex.

[73] Assignee: Shell Oil Company, Houston, Tex.

[21] Appl. No.: 987,959

[22] Filed: Dec. 10, 1997

Related U.S. Application Data

[60] Provisional application No. 60/034,140, Dec. 23, 1996.

[51] Int. Cl.$^6$ .......................... C08F 255/02; C08G 67/02
[52] U.S. Cl. .......................... 525/242; 525/276; 525/291; 525/292; 525/293; 525/296; 525/299; 525/309; 525/311; 525/312; 525/313; 525/319; 156/327; 427/207.1
[58] Field of Search .............................. 525/242, 64, 285, 525/276, 291, 292, 293, 296, 299, 309, 311, 312, 313, 319

[56] References Cited

U.S. PATENT DOCUMENTS

| | | | |
|---|---|---|---|
| 3,188,229 | 6/1965 | Graham | 427/496 |
| 4,026,967 | 5/1977 | Flexman, Jr. et al. | 525/52 |
| 4,143,096 | 3/1979 | Hudgin | 525/193 |
| 4,536,545 | 8/1985 | Olener et al. | 525/75 |
| 4,762,890 | 8/1988 | Strait et al. | 525/257 |
| 4,861,676 | 8/1989 | Lee | 428/516 |
| 4,929,672 | 5/1990 | Laughner | 525/63 |
| 4,929,673 | 5/1990 | Laughner et al. | 525/63 |
| 5,079,316 | 1/1992 | Sun et al. | 525/539 |
| 5,089,556 | 2/1992 | Tabor et al. | 525/64 |
| 5,106,916 | 4/1992 | Mithcell | 525/255 |
| 5,173,539 | 12/1992 | Boocock et al. | 525/244 |
| 5,189,091 | 2/1993 | Laughner | 524/445 |
| 5,416,148 | 5/1995 | Farah et al. | 524/409 |

FOREIGN PATENT DOCUMENTS

| | | |
|---|---|---|
| 0371699 | 11/1989 | European Pat. Off. . |
| 1459666 | 5/1974 | United Kingdom . |
| 91/09729 | 7/1991 | WIPO . |

OTHER PUBLICATIONS

Research Disclosure, Improved Coextrudable Adhesive, pp. 1–2.

*Primary Examiner*—Mark L. Warzel
*Attorney, Agent, or Firm*—Todd F. Volyn

[57] ABSTRACT

Relatively low molecular weight Olefin/CO copolymers are graft copolymerized with vinyl monomers by the exposure of a mixture of a dispersion of the two to high energy radiation such as γ ray radiation. Styrene is an example of a monomer useful in forming the graft copolymer. The graft copolymers are useful as waterborne glues particularly in the preparation of wood composites.

17 Claims, No Drawings

GRAFT COPOLYMERIZED COMPOSITIONS

This application claims the benefit of the filing of U.S. Provisional Application 60/034,140 filed on Dec. 23, 1996.

FIELD OF THE INVENTION

This invention relates to resins made from monomers of olefins and carbon monoxide and their use as adhesives.

BACKGROUND

Polymers of carbon monoxide and olefins generally referred to as polyketones are well known in the art. The class of linear alternating polymers of carbon monoxide and at least one ethylenically unsaturated hydrocarbon are of particular interest among polyketone polymers. This class of polymers is disclosed in numerous U.S. patents assigned to Shell Oil Company, exemplified by U.S. Pat. Nos. 4,880,865 and 4,818,811 which are incorporated herein by reference. Polyketone polymers display a well balanced set of mechanical properties which make them particularly useful as engineering thermoplastics.

Other materials having useful properties have also been formed from the combination of various olefins and carbon monoxide. Among these, are relatively low molecular weight materials comprising oligomers or low molecular weight polymers. In this case, however, a monomer other than carbon monoxide and ethene comprises at least 20% wt of the total weight of the polymer. Two olefinic monomers are ordinarily used such as ethene and propene with a relatively high percentage of each (on a weight or molar basis) compared to the linear alternating aliphatic polyketones used as engineering thermoplastics. The monomeric mix will typically include about 50% mole (based on total weight of polymer) CO and about 50% mole of olefins with at least about 30% by weight of the total olefin content comprised of $C_3$ or higher olefins.

These oligomers or low molecular weight polymers can be employed as thermosets. Depending upon the composition and method of preparation, many will still advantageously exhibit many properties ordinarily associated with thermoplastics under a range of conditions. In such applications they are cured with a curing agent which is generally an amine. Curing may be achieved in the presence of an acid catalyst. Such resins are preferable to existing thermosets in a variety of applications due to reduced environmental nuisances, ease of use, and property mix.

One application of these thermosets is as an adhesive. More particularly, they are useful as glues for wood composites in the preparation of plywood and flake or particle board. To this point, the wood composite industry has generally used adhesives such as urea formaldehyde resins and phenol formaldehyde resins. However, many of the wood composites prepared with them are losing favor in important market segments even though the demand generally remains high for a high impact resistant wood composite with good dimensional stability in the presence of moisture. Much of this is attributable to environmental and safety factors associated with the systems.

Wood glue compositions based on neat olefin/CO resins and amine curing agents have been previously prepared. While these neat glue systems provide good adhesion, their viscosity and pot life are not ideal for many commercial applications. Lowering their viscosity and increasing their pot life would extend the range of applications for which olefin/CO resins could be used. In particular, they could be made much more suitable for use in the production of plywood and oriented strand board under such conditions.

SUMMARY OF THE INVENTION

In one aspect of this invention, olefin/CO copolymers are graft copolymerized with vinyl monomers. Grafting is conducted through the application of high energy radiation to olefin/CO copolymers in the presence of a suitable monomer. The graft copolymers are excellent glues, particularly in wood applications, and are cured by reaction with an amine curing agent in the presence of an acid catalyst. The graft copolymers are advantageously prepared as low molecular weight polymers.

In another aspect of this invention improved adhesives are prepared. These adhesives are particularly useful for binding wood and wood byproducts and are prepared based on a copolymer of carbon monoxide, olefinically unsaturated compounds, and a curing agent.

DETAILED DESCRIPTION

Neat olefin/CO copolymer resins in combination with amine curing agents can be effectively used as wood glues. In the practice of this invention olefin/CO resins are improved through graft copolymerization. It has been found that converting the neat olefin/CO copolymer this way makes the system amenable to waterborne application, significantly lengthens potlife, and reduces the viscosity thereby significantly improving the workability of these systems. Furthermore, grafting the olefin/CO copolymers can significantly reduce the overall raw material cost of the glues since a major portion of the glue can be an inexpensive material such as styrene. Grafting is achieved through the application of high energy radiation. Generally, this results from the abstraction of a hydrogen alpha to a carbonyl group in the olefin/CO copolymer by a radical. This forms a macroradical on the olefin/CO copolymer backbone which then initiates polymerization of vinyl monomers to form a graft copolymer.

Copolymers of carbon monoxide and an olefinically unsaturated compound are known. Preferably the copolymer contains 1,4-dicarbonyl entities in its polymer chain because this arrangement accommodates certain curing reactions as, for example, with poly-primary-amines described more fully below. Such olefin/CO copolymers can be prepared by palladium catalyzed polymerization using the methods known from, for example, EP-A-121965, EP-A-181014 and EP-A-516238 (the disclosures of which are incorporated herein by reference). The polymers so prepared may be linear alternating copolymers of carbon monoxide and the olefinically unsaturated compound(s). That is, the polymer chains contain the monomer units originating in carbon monoxide (i.e., carbonyl groups) and the monomer units originating in the olefinically unsaturated compound(s) in an alternating arrangement. Perfectly alternating copolymers of carbon monoxide and olefinically unsaturated compounds are preferred because these have a higher content of carbonyl groups in the polymer chain relative to random copolymers. This can contribute to the quality of the cure of resins made from these systems leading to a high level of crosslinking.

The copolymers of carbon monoxide and olefinically unsaturated compounds may be based on a hydrocarbon as the olefinically unsaturated compound, but the olefinically unsaturated compound may also contain a heteroatom provided that it is separated from the double bond by a spacer group. For example, comonomers such as 10-undecen-1-ol and 10-undecenoic acid can be used. It is preferred that the copolymer is based on an olefinically unsaturated hydrocarbon having up to 10 carbon atoms. Aliphatic α-olefins with 3 to 6 carbon atoms are particularly suitable in this capacity and include, for example, those having a straight carbon chain such as propene, 1-butene, 1-pentene and 1-hexene. Propene is the preferred monomer of this group. It is most preferred to use a combination of ethene and propene with propene comprising the primary monomer.

The molecular weight of the copolymer prior to grafting may vary between wide limits. Copolymer with a number average molecular weight in the range of from 300 to 20,000 can be used. However, copolymers having number average molecular weights between about 500 to 5000 are preferred. Molecular weights from 1000 to 4000 are most preferred. The copolymers typically have a molecular weight distribution, such that their Q value amounts to 1.1–5, more typically 1.5–3, the Q value being the quotient of the weight average molecular weight and the number average molecular weight. The relatively low molecular weight of the copolymer enables the resin systems of this invention to be used as a liquid at the temperatures generally used in processing and working with the copolymer. This is frequently in the range of 10°–80° C., more frequently in the range of 20°–60° C. The processing of the copolymer encompasses, for example, the preparation of the binder used in this invention and the application of the binder onto the wood surface.

Prior to grafting, the copolymer comprises about 50% mole CO and 50% mole olefin wherein the olefin content comprises between 0 and 70% wt ethene and between 30 and 100% wt propene. It is more preferred that the olefinic mix is between about 20 and 70% by weight ethene and 80 and 30% wt propene. It is most preferred that the olefinic mix is about 70% wt propene and 30% wt ethene.

Grafting is conducted through exposure of an appropriate monomer and copolymer mix to high energy radiation such as e-beam radiation, ion beam radiation, γ ray radiation or mixtures of these. Suitable monomers used in forming grafts by this method include, for example, monoolefinic hydrocarbons such as the styrenes and their derivatives, monolefinically unsaturated esters such as vinyl acetate, vinyl esters of halogenated acids such as vinyl alpha-choroacetate, allyl and methallyl compounds such as allyl chloride, esters of alkenyl alcohols such as beta-ethyl allyl alcohol, haloalkyl acrylates such as methyl alphachloroacrylate, alkyl alpha-cyanoacrylates, fumarates such as diethyl fumarate, monoolefinically unsaturated nitriles such as acrylonitrile, amides of previously mentioned acids such as acrylamide, alkyl ethers such as vinyl methyl ether, vinyl sulfides such as vinyl beta ethoxyethyl sulfide, diolefinically unsaturated hydrocarbons such as 1,3 butadiene, and mixtures of the forgoing compounds. Preferred monomers are styrenes, acrylates, methacrylates, vinyl esters, and vinyl halides. Styrenes are most preferred.

The olefin/CO copolymer of this invention will typically be a liquid. Thus, a solution can generally be made from the combination of the polymer and the monomer which will form the graft. It may be necessary to emulsify this solution with a surfactant. Nonionic surfactants are preferred for this purpose. In most cases, exposure to radiation (in the absence of oxygen) which is sufficient to induce graft copolymerizationwill increase the viscosity of the liquid. However, it will not ordinarily solidify the polymer. This is useful in applying the materials as a glue since they can readily be put into waterborne solutions, applied to the materials to be glued, and then cured.

Radiation intensities sufficient to affect grafting are typically from about 0.001 to about 20 Mrads per hour. The total dose of ionizing radiation required for graft copolymerizationis usually from about 0.005 Mrads to about 20 Mrads, 0.1 Mrads being most preferred.

The polymer to be grafted should generally be kept free of oxygen during the grafting process. This can be accomplished by subjecting the polymer/monomer mix to radiation in vacuo or in an inert gas such as nitrogen, helium, neon, argon, carbon dioxide, and the like.

The temperature and pressure conditions under which grafting is conducted is not critical to this invention. Generally, any convenient temperature between about 0° C. and 100° C. can be used as the reaction temperature. The reaction will still occur at temperatures below the lower limit but reaction rates will slow significantly. Generally, atmospheric pressures are used but here too, wide ranges of conditions are possible without significantly affecting the grafting process.

The reaction time can be varied over a wide range. When a high dose of radiation is applied, the reaction may occur in seconds. In the preferred range of radiation dosages of between about 0.05 Mrad and 2 Mrad at ambient temperatures, reaction times of between about 10 seconds and 24 hours will advantageouslyprovide a grafting efficiency of between about 5 and 95%. Graft efficiency is a ratio of the amount of monomer grafted to the amount of monomer available on a weight basis.

In glue applications, a waterborne solution of the graft copolymer is typically prepared to achieve lower viscosity relative to the neat graft copolymer. A high solids content is desired provided that viscosity can be kept low enough to easily work with the material. Solids contents up to about 60% can be achieved under these conditions using glues made from the graft copolymers of this invention. The degree of grafting and the characteristics of the olefin/CO polymer may require the use of a surfactant. A diluent may also be added but is not preferred.

Any surfactant capable of dispersing the graft copolymer in water can be used. Preferably, the surfactants are nonionic and include, for example, polyalkylene glycols generally, and polyalkylene glycol alkyl ethers, polyalkylene glycol alkyl phenyl ethers, polyalkylene glycol fatty acid esters, sorbitan fatty acid esters, alkyl polyglycoxides, fatty acid dialkanol amides, and the like. Selection of the amount of surfactant added to form the emulsion is well within the grasp of one having ordinary skill in the art. Typically, the surfactant will comprise about 3 to 15% weight of the graft copolymer.

Once waterborne graft copolymer solutions of this invention are prepared they can be further applied as glues and adhesives (commonly referred to as binders) through the addition of a curing agent and, optionally, a catalyst. Binders so prepared can then be used to join together two or more materials of like or dissimilar character. For example, composites can be formed of wood parts, wood chips, veneers of different species, metals, various polymers, and other materials. Composites formed from the union of two or more wood parts are a most preferred embodiment of this invention.

The species and the form of the wood parts which are used for producing the composites are not critical. The wood may be a high or a low density wood and it may be of deciduous or coniferous origin. Examples of suitable species are oak, chestnut, ash, maple, teak, okoume, mahogany, meranti and pine. Very good results can be obtained with beech, spruce and poplar. The wood does not need any pretreatment other than which may normally be applied when a conventional binder is used. It is generally sufficient to bring the wood parts in the size and shape desired for the type of composite to be produced, for example, by applying mechanical and/or chemical means. Suitably the wood is used in the form of planks, veneers, timber, lamellae, chips or pulp. A combination of two or more species or forms of wood parts may be used, for example, to improve the appearance of the composite.

The wood may be pretreated to increase its durability. An example of such a pretreatment is treatment with superheated steam at 150°–220° C. under pressure followed by heating at 100°–220° C. at ambient pressure. Another pretreatment is salt impregnation with, e.g., chromium, copper, mercury, arsenic salts or combinations thereof.

Many curing agents can be used in the binder according to this invention. Suitable curing agents or curing systems are disclosed in EP-A-372602 (the disclosure of which is incorporated herein by reference) and may comprise, for example, an amine, a thiol or acrylonitril. Preferred curing agents include, for example, hexamethylenediamine (HMDA), hexamethylenediamine carbamate, tetramethylenepentamine, hexamethylenediaminecinnamaldehyde adduct, and hexamethylenediaminedibenzoate salt. Aromatic amines and cycloaliphatic amines can be used but those having bulky functional groups are not preferred. Aliphatic primary diamines having the formula $H_2N-R-NH_2$, (R denotes a bivalent aliphatic bridging group having up to 10 carbon atoms in the bridge) are preferred curing agents. HMDA is the most preferred curing agent.

It can also be advantageous to employ a mixture of curing agents. In particular a mixture of a relatively more reactive curing agent and a less reactive curing agent is useful. For example, straight chain aliphatic diamines may be used as the more reactive curing agent in combination with aromatic or cycloaliphatic poly-primary amines as the less reactive curing agent. By the presence of the more reactive curing agent a rapid gelling can be achieved once the curing has started. Upon prolonged curing the cyclic carbon skeleton of the less reactive curing agent will boost the mechanical strength of the composite at a high temperature. The molar ratio of the more reactive curing agent and the less reactive curing agent may vary between wide limits according to the requirements of the particular use of the binder. This molar ratio can be determined readily by the skilled person by applying routine experimentation. Typically the molar ratio will be about 2:98 to 98:2.

The degree of crosslinking occurring during the curing is dependent, inter alia, on the quantity of curing agent used relative to the quantity of the copolymer of carbon monoxide and olefinically unsaturated compound. The relative quantity of curing agent may vary between wide ranges and by routine experimentation a preferred relative quantity can be established. When a poly-primary-amine is used as curing agent, the molar ratio of the carbonyl groups in the copolymer and the primary amine groups of the curing agent is suitably in the range of from 0.25 to 8.0 and more suitably in the range of from 0.4 to 2.0.

The curing of the copolymer may be carried out in the presence of a curing catalyst or in the absence of any curing catalyst. Advantages of using a catalyst will generally be that the curing can be carried out at a lower temperature or during a shorter period of time. When the curing agent is an aliphatic diamine, suitable catalysts are weak acids, in particular acids having a $pK_a$ in the range of from 2 to 5.5, preferably in the range of from 2.5 to 5, when measured in water at 20° C. A preferred class of acids are the organic acids, in particular carboxylic acids, because these are at least to some extent soluble in the copolymer to be cured. Monocarboxylic acids are more preferred due to their generally better solubility in the copolymer. Examples of monocarboxylic acids are acetic acid, nicotinic acid, pivalic acid, valeric acid, benzoic acid and, salicylic acid. Another suitable weak acid is phosphoric acid. Acetic acid is the most preferred catalyst.

The weak acid may be used in small quantities. Suitable quantities are from 0.1 to 15.0% by weight relative to the weight of the copolymer. It is more preferred that the weak acid is used in a quantity of from 0.2 to 10.0% by weight. It is most preferred that from 0.5–8.0% w, on the same basis is used.

The waterborne glue compositions of this invention typically display viscosities which make them easy to work with. Typically these range between about 200 and 5000 mPa.sec at room temperature as measured in a Brookfield viscometer. However, if desirable, a diluent may be used in the curable resin composition to facilitate the application of the composition onto the wood parts. A diluent may also improve the compatibility of the curing agent and any catalyst with the copolymer. Suitable diluents are, e.g., lower alcohols, lower ketones, lower esters, such as acetates, and lower ethers. The term "lower" refers to diluents with an average of 5 or less carbon atoms per molecule. Preferred diluents are water and lower alcohols, with water being most preferred. Examples of other suitable diluents are acetone, ethyl acetate, methyl propionate and ethylene glycol dimethylether. When the curable resin composition is to be applied, for example, by spraying, the viscosity may suitably be in the range of 100 to 2000 mPa.s, preferably in the range of 500 to 1000 mPa.s, at the temperature of application. Preferably the diluent and the copolymer are used in a weight ratio of at least 1:5, in particular in the range of 1:2 to 5:1, more in particular 1:1.5 to 2:1.

The binder may contain additional components which may be added to modify properties of the binder. Examples of suitable additional components are viscosity modifiers, flame retardants, gap filling agents, antioxidants, UV stabilizers and colorants. For example, clay may be used as a filler or it may be used to decrease the viscosity at high shear rate. A suitable gap filling agent is silica, cereal flour, or coconut shell flour. Antioxidants and UV stabilizers are particularly desirable additives when the composition formed according to this invention is used as a coating material.

The binder may be applied to the wood surface using any conventional technique. The binder may be spread over the surface by using, for example, a brush, a roller, a knife or a blade. It has already been indicated that, after the addition of a suitable quantity of diluent, the binder can also be applied by spraying it by means of a nozzle driven by a compressed gas, for example, as in continuous in-line spraying or by using a paint-sprayer. If desired, when a composite having a soft hand feel is to be produced, the binder may also be applied as a coating at wood surfaces which will be positioned at the outer surface of the composite. It is also possible to coat the cured composite and to cure the coating in an additional curing step.

The quantity of binder relative to the quantity of wood may vary between wide limits and will generally be dependent of the type of composite to be produced. For wood laminates this quantity may be specified per square meter of wood surface covered by the binder or per square meter of joint present between two wood lamellae. Typically, between about 30 and 400 g of the binder per square meter of joint are used. Preferably, between about 60–120 g of binder is used.

When the wood composite is a fiber board or a particle board the quantity of binder may more conveniently be related to the weight of the composite. Per kilogram of the fiber board or particle board typically such a quantity of binder is used which is based on 20–150 g, more typically 30–100 g of the copolymer of carbon monoxide with an olefinically unsaturated compound. For special applications of fiber boards it may be desired to have the binder present as the continuous phase, in which cases per kilogram of the composite such a quantity of binder may be used which is based on 150–600 g and in particular 200–500 g of the copolymer of carbon monoxide with an olefinically unsaturated compound.

After, or simultaneously with, applying the binder onto the wood surface the wood parts are brought together, such that binder resides between wood parts, and curing conditions are subsequently applied. The temperature and the pressure may vary between wide limits. The temperature will generally be dependent of the curing agent and the presence of a curing catalyst. When a poly-primary-amine is used as curing agent the temperature will suitably be above 50° C., for example, in the range of from 80° C. to 200° C., in particular 100° C. to 160° C. For laminates typical pressures are in the range of from 1 to 30 kg/cm$^2$, preferably from 2.5 to 25 kg/cm$^2$. In fiber board and particle board applications typical pressures are in the range of from 10 to 150 kg/cm$^2$, preferably from 25 to 100 kg/cm$^2$.

Various types of wood composites can be produced according to this invention, such as fiber board, particle board, for example, wafer board, and laminate, such as plywood and laminated beam or timber. The composites have an excellent impact resistance/strength balance and in the presence of moisture they have an excellent dimensional stability. Hence, the composites can advantageously be applied in the production of doors, parquet flooring, sport articles, such as hockey sticks and electrical appliances, such as switchboards and panels for distributing boxes. Fiber boards which have the binder as the continuous phase can find utility as construction panels.

The invention will be further illustrated by means of the following nonlimiting examples. Glue formulations are as follows: A=100 parts by weight (pbw) of the Emulsion of Example 2, 25 pbw 65% HMDA, 4 pbw 20% acetic acid. B=100 pbw of the Emulsion of Example 3, 21 pbw 65% HMDA, 3.3 pbw 20% acetic acid. C=100 pbw of the Emulsion of Example 4, 25 pbw 65% HMDA, 4 pbw 20% acetic acid.

EXAMPLE 1

(Olefin/CO Polymer Preparation)

A mechanically stirred autoclave with a volume of 350 ml was charged with 100 ml methanol, and 40 g of propene. The contents of the autoclave were heated to 85° C. and a 80/20 by volume mixture of CO/ethene was forced in to obtain a total pressure of 55 bar. A catalyst solution of 9.9 mg palladium acetate, 27.2 mg 1,3-bis(diethylphosphino)-2,2-diethylpropane and 8.1 μl trifluoromethanesulfonic acid in 10 ml of acetone was injected into the autoclave. The pressure was kept constant by continuously introducing a 80/20 CO/ethene mixture.

A perfectly alternating linear copolymer of olefin/CO copolymer was obtained. The distribution of olefins was 28% w ethene and 72% w propene on a molar basis. The copolymer had a number average molecular weight of 1800.

EXAMPLE 2

(Preparation of a Waterborne Resin)

To a resin kettle equipped with an anchor-shaped stirrer was added a mixture of 76.6 parts by weight (pbw) of a perfectly alternating copolymer as prepared in Example 1,52 pbw of a nonionic poly(ethylene glycol) surfactant (commercially available under the tradename "F88" by BASF), and 108 pbw of water. The mixture was stirred at 200 rpm and additional aliquots of the copolymer were added over a period of 2 hours until the total amount of copolymer in the mixture was 500 pbw. After further stirring at ambient temperature for 3 hours, 343 pbw of water was added over a period of 1 hour to yield an emulsion with a 55% solids content.

EXAMPLE 3

(Preparation of Waterborne Olefin/CO Resin Grafted with Polystyrene)

To 479 pbw of the emulsion prepared in Example 2 was added 144 pbw of water, 163 pbw of styrene and 1.45 pbw of potassium persulfate. The mixture was placed in a bottle, shaken for 15 minutes, and placed in an oven at 60° C. overnight. The product was an emulsion of olfein/CO copolymer grafted with polystyrene. The weight ratio of olefin/CO copolymer to polystyrene was 60/40 and the solid content of the emulsion was 55% by weight.

EXAMPLE 4

(Preparation of Waterborne Olefin/CO Resin Grafted with Poly(methylmethacrylate)

A mixture of 90 pbw of the emulsion prepared according to Example 2, 29.8 pbw of methyl methacrylate, and 0.1 pbw of potassium persulfate was heated in a resin kettle with stirring at 60° C. for 6 hours. An emulsion of olefin/CO copolymer grafted with poly(methyl methacrylate) was formed. The weight ratio of olefin copolymer to poly(methyl methacrylate) was 60/40 and the solid content of the emulsion was 66% wt.

EXAMPLE 5

Graft Copolymerization of Olefin/CO Polymers by Irradiation

A terpolymer of carbon monoxide, ethylene, and propylene was produced in the presence of a catalyst composition formed from palladium acetate, the anion of triflouroacetatic acid and 1,3-bis(diphenylphosphino)-propane. The melting point of the linear terpolymer was 220° C. and it had a limiting viscosity number (LVN) of 1.8 measured at 60° C. in m-cresol.

A mixture of 10 g of the terpolymer and 2 g of styrene inhibited with 10 ppm of t-butylcatechol was placed in a glass jar in the presence of air and irradiated with a $^{60}$Co γ ray source at 0.26 Mrad/hour and ambient temperature for 24 hours. The resulting solid was extracted with hot toluene to remove homopolystyrene. Solid state $^1$H NMR analysis of the extracted product showed that it contained grafted polystyrene. The grafting efficiency (monomer grafted/total monomer) was 78%.

This example illustrates that polymers based on an olefin/CO backbone can be graft copolymerized through the application of high energy radiation.

EXAMPLE 6

(Preparation of Low Molecular Weight Olefin/CO Graft Copolymer: Hypothetical)

To 500 pbw of the emulsion prepared in Example 2 is added 150 pbw of water and 170 pbw of styrene. Irradiation of the resulting mixture with a $^{60}$Co γ ray source at 0.26

Mrad/h and ambient temperature fo 0.5 h. will graft polymerize the styrene to produce a waterborne emulsion with a 55% solids content.

EXAMPLE 7

Preparation of Plywood Panels and Performance Comparison

This example is a modified version of Plywood Specimen Test 6.1.5.3 as described in "PSI-95, Construction and Industrial Plywood", 1995 reproduced by the American Plywood Association and incorporated herein by reference.

Three-layer (nonnotched) crossply wood panels were prepared from 1/8" southern pine veneers using three different waterborne glue forumlations prepared by mixing the emulsions obtained in Examples 2, 3, and 4 respectively, with hexamethylenediamine (HMDA) and acetic acid. A waterborne glue using emulsions according to Example 6 can be formed in the same manner. The panels were hot pressed at 200° C. and 200 psig. The dosage used for all panels was 65 g of solid/m$^2$ per glue line. To evaluate water resistance, 1"X3" specimens were cut from the panels, soaked in boiling water for 4 hours, dried in an oven at 63° C. for 23 hours, and immersed in water for 4 hours. Glue performance was rated according to the number of specimens which did not delaminate after the 2-cycle boil test for a given hot press time.

Results are listed in Table 1 below.

TABLE 1

| Glue Formulation | Press Time at 200° C. | | |
|---|---|---|---|
| | 4.5 min | 6 min | 10 min |
| | (Number of Plywood Test Specimens Surviving After Boil Test) | | |
| A | 0 | 0 | 3 of 5 |
| B | 0 | 3 of 3 | 3 of 3 |
| C | 2 of 3 | 3 of 3 | 3 of 3 |

This example illustrates the superior wood bonding that is attainable through use of glues made according to this invention. Specimen A employed a glue comprised of olefin/CO polymer which was not graft copolymerized. Specimens B and C were glues made from graft copolymers. Glued samples employing the nongrafted polymer as the glue required a 10 min hot press time to survive the boil test. Glued samples using glues made with graft copolymers survived boil with a 6 min (or less) hot press time. Glues made from graft copolymers according to the process of this invention would also show this improvement.

I claim as my invention:

1. A method of making a curable resin comprising:
   (a) combining an olefin/CO copolymer having a number average molecular weight between about 500 and 5000 in water to form an olefin/CO copolymer dispersion and a vinyl monomer, and
   (b) exposing the combination of olefin/CO copolymer and vinyl monomer to high energy radiation to form a graft copolymer.

2. The method of claim 1 wherein the high energy radiation is e-beam, ion beam, γ ray radiation, or combinations thereof.

3. The method of claim 2 wherein said radiation dosage is between about 0.005 and 20 Mrad.

4. The method of claim 3 wherein said reaction is conducted between about 0° and 90° C. for between about 10 seconds and 24 hours.

5. The method of claim 1 wherein the vinyl monomer is a monoolefinic hydrocarbon, monolefinically unsaturated ester, vinyl ester of halogenated acids, allyl compound, methallyl compound, esters of alkenyl alcohol, halo-alkyl acrylate, alkyl alpha-cyanoacrylate, fumarate, monoolefinically unsaturated nitrile, monolefinically unsaturated amides, vinyl amides of halogenated acids, amides of alkenyl alcohol, halo-alkyl acrylamides, alkyl alpha-cyanoacrylamide, amides of fumaric acids, vinyl alkyl ether, vinyl sulfides, diolefinically unsaturated hydrocarbon, or mixtures thereof.

6. The method of claim 1 wherein said vinyl monomer is a styrene, acrylate, methacrylate, vinyl ester, or vinyl halide.

7. The method of claim 1 wherein the vinyl monomer is styrene.

8. A method of making a waterborne glue comprising:
   (a) combining an olefin/CO copolymer having a number average molecular weight between about 500 and 5000 in water to form an olefin/CO copolymer dispersion and a vinyl monomer,
   (b) combining the olefin/CO copolymer dispersion with a vinyl monomer to form a dispersion, and
   (c) exposing the dispersion of olefin/CO copolymer and vinyl monomer to high energy radiation to form a graft copolymer dispersion.

9. The method of claim 8 wherein the vinyl monomer comprises between about 10 and 60% by weight of the olefin/CO copolymer.

10. The method of claim 8 wherein the vinyl monomer is a monoolefinic hydrocarbon, monolefinically unsaturated ester, vinyl ester of halogenated acids, allyl compound, methallyl compound, esters of alkenyl alcohol, halo-alkyl acrylate, alkyl alpha-cyanoacrylate, fumarate, monoolefinically unsaturated nitrile, monolefinically unsaturated amides, vinyl amides of halogenated acids, amides of alkenyl alcohol, halo-alkyl acrylamides, alkyl alpha-cyanoacrylamide, amides of fumaric acids, vinyl alkyl ether, vinyl sulfides, diolefinically unsaturated hydrocarbon, or mixtures thereof.

11. The method of claim 1 wherein said vinyl monomer is a styrene, acrylate, methacrylate, vinyl ester, or vinyl halide.

12. The method of claim 1 wherein the vinyl monomer is styrene.

13. The method of claim 9 further comprising the step of combining said graft copolymer with a surfactant.

14. A method of forming a composite of two or more parts comprising:
   (a) combining an olefin/CO copolymer having a number average molecular weight between about 500 and 5000 in water to form an olefin/CO copolymer dispersion and a vinyl monomer,
   (b) exposing the combination of olefin/CO copolymer and vinyl monomer to high energy radiation to form a graft copolymer dispersion,
   (c) combining said copolymer with water to form a glue,
   (d) applying said glue to one or more parts to be joined together, and
   (e) joining said parts together.

15. The method of claim 14 further comprising the step of adding a curing agent to said glue.

16. The method of claim 15 wherein said curing agent is an amine.

17. The method of claim 15 further comprising the step of adding an acid to the combination of said glue and curing agent.

* * * * *